United States Patent
Grunberger et al.

(10) Patent No.: US 10,673,171 B2
(45) Date of Patent: *Jun. 2, 2020

(54) OUTLET FACEPLATE EXTENSION

(71) Applicants: Faith Chana Grunberger, Brooklyn, NY (US); Aaron Grunberger, Brooklyn, NY (US)

(72) Inventors: Faith Chana Grunberger, Brooklyn, NY (US); Aaron Grunberger, Brooklyn, NY (US)

( * ) Notice: Subject to any disclaimer, the term of this patent is extended or adjusted under 35 U.S.C. 154(b) by 152 days.

This patent is subject to a terminal disclaimer.

(21) Appl. No.: 15/680,304

(22) Filed: Aug. 18, 2017

(65) Prior Publication Data

US 2017/0346212 A1 Nov. 30, 2017

Related U.S. Application Data

(63) Continuation of application No. 14/544,453, filed on Jan. 8, 2015, now Pat. No. 9,742,094, which is a continuation-in-part of application No. 13/941,590, filed on Jul. 15, 2013, now abandoned.

(51) Int. Cl.
| | |
|---|---|
| H01R 13/502 | (2006.01) |
| H01R 13/46 | (2006.01) |
| H01R 13/74 | (2006.01) |
| H02G 3/18 | (2006.01) |
| H02G 3/14 | (2006.01) |
| H01R 25/00 | (2006.01) |

(52) U.S. Cl.
CPC ......... *H01R 13/502* (2013.01); *H01R 13/46* (2013.01); *H01R 13/745* (2013.01); *H01R 25/006* (2013.01); *H02G 3/14* (2013.01); *H02G 3/18* (2013.01)

(58) Field of Classification Search
CPC .................................................. H01R 13/502
See application file for complete search history.

(56) References Cited

U.S. PATENT DOCUMENTS

| | | | | |
|---|---|---|---|---|
| 3,611,247 | A * | 10/1971 | Adams | H01R 13/502 439/106 |
| 3,856,376 | A * | 12/1974 | Poliak | H01R 13/502 439/465 |
| 5,071,366 | A * | 12/1991 | Bernardini | H01R 4/2433 439/417 |
| 5,742,464 | A * | 4/1998 | Ceola | H01R 13/7137 361/103 |
| 6,257,923 | B1 * | 7/2001 | Stone | H01R 13/516 280/422 |
| 6,514,093 | B1 * | 2/2003 | Yu | H01R 25/006 439/105 |
| 7,438,589 | B1 * | 10/2008 | Fleury | H01R 25/006 439/34 |
| 7,559,795 | B2 * | 7/2009 | Byrne | H01R 31/06 439/536 |
| 8,118,616 | B1 * | 2/2012 | Clark | H01R 25/006 439/640 |
| 9,742,094 | B1 * | 8/2017 | Grunberger | H01R 13/46 |
| 2009/0124136 | A1 * | 5/2009 | Pepe | H01R 4/242 439/676 |

(Continued)

*Primary Examiner* — James Harvey (57) ABSTRACT

An outlet faceplate extension device includes female receiving components at a first side, male electronic components at a second side, and a rim that is connectable to furniture.

20 Claims, 9 Drawing Sheets

(56) References Cited

U.S. PATENT DOCUMENTS

2010/0317223 A1\* 12/2010 Byrne .................. H01R 13/514
439/540.1
2015/0325962 A1\* 11/2015 Byrne .................... H01R 13/73
439/529

\* cited by examiner

OUTLET FACEPLATE EXTENSION

CROSS-REFERENCE TO RELATED APPLICATIONS

The present application is a continuation of U.S. patent application Ser. No. 14/544,453, which (a) was filed on Jan. 8, 2015, (b) is issuing on Aug. 22, 2017 as U.S. Pat. No. 9,742,094, and (c) is a continuation-in-part of U.S. patent application Ser. No. 13/941,590, filed Jul. 15, 2013, the entire contents of each of which are hereby incorporated herein by reference.

FIELD OF THE INVENTION

The present invention relates to a device for providing outlet functionality in furniture.

BACKGROUND

An outlet includes one or more, usually at least two, sockets into which plugs of electronic devices can be plugged to connect the electronic devices to the power supply of a building. The outlet is fixedly installed into the wall of the building. The electronic devices are often movable, as are the plugs thereof. The socket includes slots, slits, and/or holes forming a female receiving part of the electrical connection and the plugs of the electronic devices include prongs, which are the male protrusions that fit into the female receivers of the socket.

Buildings are often built with outlets positioned at strategically selected locations based on building code and/or expected future use of electronic devices. However, it can occur that after the installation of the outlets, it is decided to install furniture which covers some of the previously installed outlets, thereby rendering such outlets inaccessible, especially for heavy furniture which is difficult to move. For example, a bookcase and/or desk can be so positioned as to cover and render inaccessible one or more outlets, such furniture being difficult to move for each time a user wishes to plug in or unplug a device from the outlets. On the other hand, particularly in, for example, a home-office, where a user wishes to plug in a laptop or other office-type equipment such as lamps, printers, modems, telephones, etc., such lack of access causes the user much frustration.

SUMMARY

Example embodiments of the present invention provide a device that extend, outlet functionality to installed furniture. The device is installable in the furniture and, for example, appears the same as or substantially similar to the outlet installed in the building wall. The device includes on a face, which, when installed in furniture, is exposed, female receiving components adapted for receiving therein prongs of an electronic device. The device further includes, at a side of the device opposite the side in which the female receiving components of the device are accessible, male prongs like those which the receiving components are adapted to receive.

According to an example embodiment, the device preferably includes a plurality of sets of female receiving components on the first side and a corresponding plurality of sets of male prongs on the second side. Typical wall installed outlets often include two sets of female receiving components allowing for two electronic devices to be simultaneously connected to the outlets. Therefore, according to an example embodiment, in order to provide access, via installed furniture, to both sets of female receiving components of an outlet blocked by the furniture, the device of the present invention includes two sets of female receiving components at the first side thereof, and, correspondingly, two sets of male prongs at the second side thereof.

According to an example embodiment, the device further includes a border plate which is attachable to furniture. According to a preferable example embodiment, the first side of the device includes a first surface with openings, which are the entrances of the female receiving components thereof, the first surface being substantially even with a front surface of the plate. The male prongs on the second side of the device protrude in a direction away from the first side of the device and beyond a plane of the back surface of the plate.

According to an example embodiment, the border plate includes a connecting component, the connecting component configured to connect the device to furniture. For example, according to an example embodiment, the border plate includes bores with screws therein, the screws being capable of being screwed into a surface of a piece of furniture to affix the device to the furniture. Other suitable connecting components, such as clips, can be used instead.

While the device, when so affixed to the furniture, appears at the front face thereof to be a typical outlet, in actuality, the device is not itself a fully functional outlet, but rather includes, at the opposite thereof, male prongs like those of the electrical devices which the female receiving components of the device are adapted to receive.

According to an example embodiment, the border plate borders an interior region of the device, which interior region includes the female and male components of the device.

According to an example embodiment, the second side, including the prongs, further includes an electric cord that includes a first end at a face of the second side and that extends from the first end to a second end at which the cord terminates with the prongs. The cord is flexible, allowing for flexibly maneuvering the prongs to be able to plug into a wall outlet which is not directly lined up with the device.

According to an example embodiment, the border plate and interior region of the device are detachably connected to each other. For example, according to an example embodiment, the interior region includes, at an outer edge thereof, a flexible clip that is arranged to be pressed inwards more interiorly towards the center of the interior region, and is biased to spring outward away from the center of the interior region. According to an example embodiment, when the device is viewed on a horizontal plane, the clip is sloped from a narrow profile at a lower region to a wider profile at an upper region. The sloping edge is the outer edge of the clip facing away from the center of the interior region. When the border plate is, for example, installed in a piece of furniture, the interior region can be inserted into the border plate. As the interior region is being inserted in the border plate, the interior edge of the border plate engaged the lower region of the clip. With continued insertion of the interior region, the border plate causes the clip to bend inwards due to the gradual widening of the clip profile. The clip further includes at its outer edge a cut out in the wider profile region thereof. With continued insertion of the interior region into the border plate, the cut out lines up with border plate, at which point, the clip flexes outwards again, the cut out thereby engaging with the border plate to hold the interior region connected to the face plate. A user can remove the interior region from engagement with the border plate by pressing the clip inwards towards the center of the interior region, thereby disengaging the cut out of the clip from the border plate.

According to an example embodiment, the interior region includes in a faceplate thereof a cutout for receiving the clip when the clip is pressed inwards. The cutout of the clip lines up with the cutout of faceplate Thus, for example, the interior region includes a faceplate including openings for the female receiving components. When the faceplate is viewed in a horizontal plane, the interior region includes a clip, which clip includes an extension element that is attached at a first end thereof to the faceplate and that terminates at a second end that is lower than the faceplate. The clip further includes a sloping element that is attached at its narrow region to the extension element and that slopes outward from the narrow region to the wider region back upwards towards the faceplate. The upper-wider region can be bent inwards toward the faceplate.

According to an example embodiment, the openings of the female components of the interior region are in a face of the faceplate of the interior region facing away from the narrow profiled end of the clip and the male prongs extend from an opposite side of the faceplate towards the narrow profiled end of the clip.

According to an example embodiment, the interior region includes two such clips, including a first clip at a first outer edge of the interior region and a second clip at a second outer edge of the interior region, the first and second outer edges being opposite each other. The two clips can be pressed inwards towards each other, towards the center of the interior region, and are biased outwards away from each other and away from the center of the interior region, so that when the cutouts of the clips line up with the border plate, the clips spring outwards, thereby detachably connecting the interior region to the border plate.

According to an alternative example embodiment, the clips are designed with a smaller profile that slides within a groove of the faceplate of the interior region. According to an example embodiment, a spring is further included to bias the clip outwards towards the border plate.

According to an alternative example embodiment, the clips are fixedly attached to the border plate and are configured to detachably engage the interior region, with the described cutouts being in the border plate instead of the interior region. However, it is advantageous to provide the above-described fixed connection of the clips to the interior region for detachable engagement to the outer region, so that one can pull on the clips to remove the interior region from the outer region, which outer region can be fixedly attached to furniture.

According to an example embodiment, a single integrated faceplate includes the female receiving components at a first side thereof, and the male components at the opposite side thereof. Furthermore, the faceplate includes a bordering flange with a flatter profile than the center region of the faceplate, which center region includes the female and male components. The flatter region allows for the faceplate to be mounted against a board of a furniture piece, with the male components and the portion of the female components beyond the initial receiving entrances at the first side, at which the device is configured to receive a plug. (The first side includes the initial entrances to the female components, but the female components actually continue beyond the first side and beyond a thickness of the bordering flange.) The thickness of the female components and the male components as well therefore can extend through and beyond a hole cut out into the furniture, with the bordering flange being mounted onto the part of the furniture in which the furniture hole has been cut.

It is noted, however, that it is advantageous to provide the interior and outer regions as components removably connectable to each other because, once furniture is backed up towards a wall including an outlet to which to electrically connect the device, it can be difficult to maneuver the connection to the outlet. Therefore, it is desirable to allow for the interior region to be removed so that one can insert a hand into the center of the device and through a hole in the furniture to adjust the connection to the outlet, and then allow for an easy reconnection of the interior region of the device to the outer region of the device.

It is noted that the openings for the female components need not be flush with the faceplate of the interior region, but can instead be at an upper edge of a protrusion that protrudes from the faceplate.

According to an alternative example embodiment, the border plate includes a rigid outer region and an interior flexible region, for example, made of rubber. The flexible region defines an interior hole in the border plate in which to receive a head of a conventional extension cord, which head includes one or more sets of female receiving components for receiving one or more corresponding sets of male prongs of one or more corresponding electronic devices. The extension cord head, when received in the interior hole defined by the flexible region, is held removably connected to the border plate by friction fit with the flexible region of the border plate.

According to yet another example embodiment, the device includes a plurality, e.g., two, such flexible regions into which female to male components are insertible. For example, conventional three-prong to two-prong converters can be used. Alternatively, a female to male device like that of the conventional three-prong to two-prong converter, but which instead provides a three-prong to three-prong extension, can be used.

According to alternative example embodiments, instead of the female and male components for an outlet, other female and male components are provided for other types of electrical connections. For example, according to an example embodiment, one side of the interior region includes a female receiving part for coaxial cable and the opposite second side of the interior region includes a male coaxial connecting component for coaxial component. According to another alternative example embodiment, the first side includes a female connecting part for receiving a telephone cable and the second side includes a male connecting part for connecting to a telephone jack. According to another alternative example embodiment, the first side includes a female connecting part for receiving an ethernet cable and the second side includes a male connecting part for connecting to an ethernet jack.

DETAILED DESCRIPTION

Figure 1:
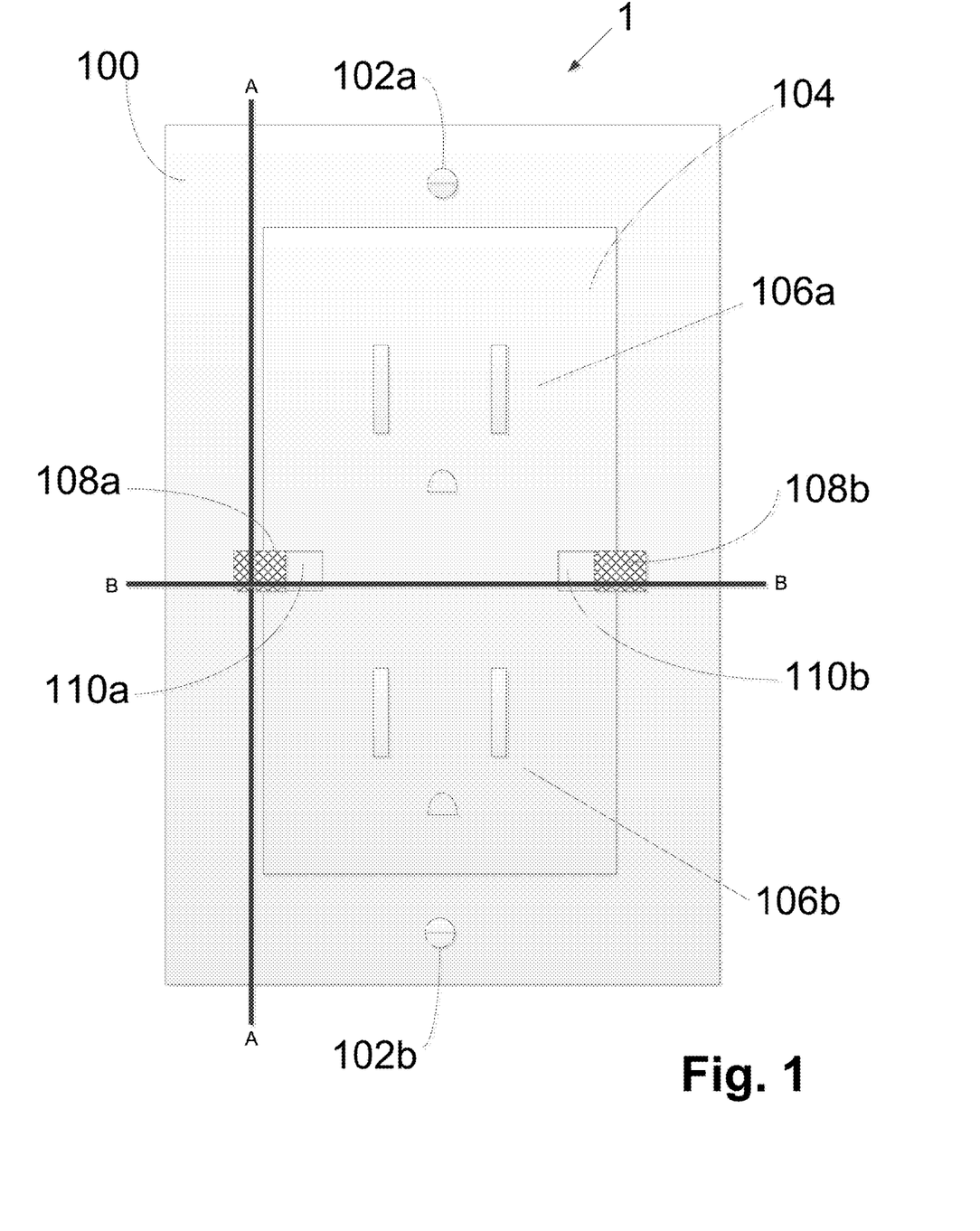
FIG. 1 shows an outlet faceplate extension device according to an example embodiment of the present invention.

FIG. 1 shows an outlet faceplate extension device 1 at a first side thereof, according to an example embodiment of the present invention. The device 1 includes an outer border plate 100. The outer border plate 100 is shown to include connecting components 102a and 102b, which, according to an example embodiment, are screws within respective holes. Although shown vertically arranged at a top and bottom of the device 1, they can be located at other positions on the outer border plate 100. Additionally, according to other example embodiments, other connectors can be used. For example, an adhesive can be applied to a back side (the reverse side of that shown in FIG. 1) of the outer border plate 100.

FIG. 1 further shows an interior plate region 104, which includes two sets of female receiving components 106a and 106b, the entrances of which are shown in FIG. 1, which sets of female receiving components 106a and 106b are each adapted for receiving respective sets of male prongs of plugs of respective electrical devices. Although FIG. 1 shows two sets of female receiving components 106a and 106b, according to alternative example embodiments, the device 1 can instead include more or less sets of female receiving components.

The outer border plate 100 and the interior plate region 104 are separable from each other according to the embodiment shown in FIG. 1. To allow for the interior plate region 104 to be removably connected to the outer border plate 100, the device includes interconnection elements 108a and 108b and grooves 110a and 110b in the interior plate region 104, in which grooves 110a and 110b the interconnection elements 108a and 108b are slidable. The interconnection elements are biased outwards towards the outer border plate 100 for engagement therewith, but can be pressed inwards to slide within grooves 110a and 110b to disengage the interconnection components 108a and 108b from the outer border plate 100, thereby releasing the interior plate region 104 from the outer border plate 100 to allow for removal of the interior plate region 104 from the outer border plate 100.

Figure 2:
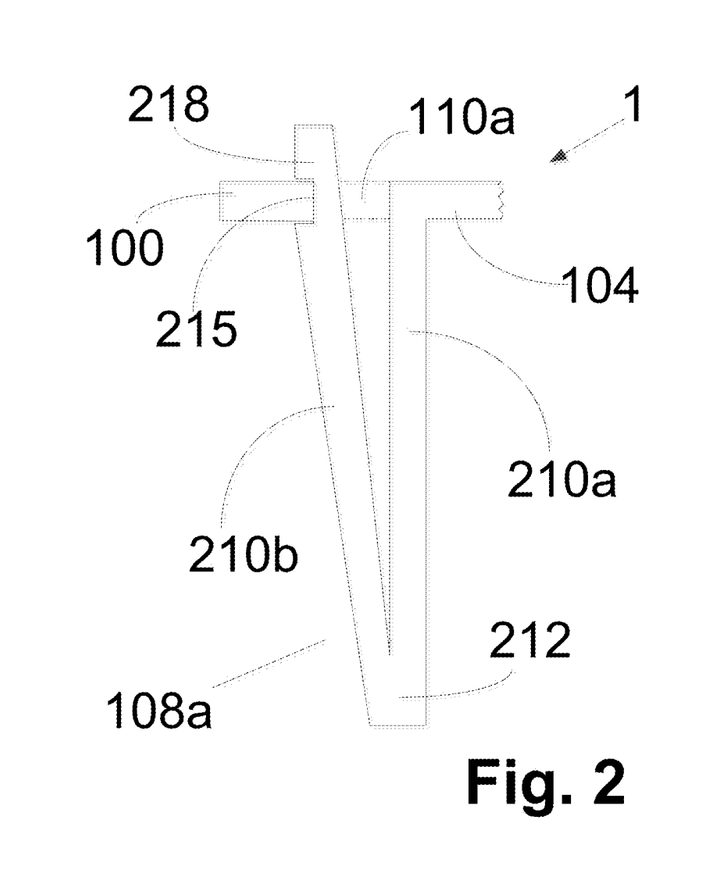
FIG. 2 shows an example of the device at a portion of a cross-section taken along lines B-B' of FIG. 1, according to an example embodiment of the present invention.

FIG. 2 shows an example of the device 1 at a portion of a cross-section taken along lines B-B' of FIG. 1, according to an example embodiment of the present invention. As shown in FIG. 2, the interconnection element 108a is 'V' shaped with two arms 210a and 210b connected to each other at a connection point 212. The first arm 210a is fixedly (and, according to an example embodiment, integrally) connected to the interior plate region 104. The second arm 210b is biased outwards away from first arm 210a and towards the outer border plate 100, but can be pressed inwards towards first arm 210a to slide within groove 110a. The second arm 210b includes a cutout 215 for receiving the outer border plate 100 when the second arm 210b is released to extend in its biased direction.

The interior plate region 104 can be inserted into the outer border plate 100, leading with the connection point 212. During the insertion, the second arm 210b engages the outer border plate 100, the outer border plate 100 thereby pushing the second arm 210 inwards towards the first arm 210a. After continued insertion, so that the cutout 215 lines up with the outer border plate 100, the second arm 210b extends outward again in its biased direction towards the outer border plate 100, thereby engaging the outer border plate 100, thereby connecting the interior plate region 104 to the outer border plate 100.

The second arm 210b further includes an extension 218, which extends above the cutout 215. After engagement of the second arm 210b with the outer border plate 100, one can press on the outward facing vertical side of the extension 218, to move the arms 210b inwards toward first arm 210a, thereby disengaging the second arm 210b from the outer border plate 100, thereby releasing the interior plate region 104 from the outer border plate 100, so that the interior plate region 104 can be removed from the outer border plate 100.

Interconnection element 108b can be configured like the interconnection element 108a but as a mirror image thereof, so that the extensions 218 of the interconnection elements 108a and 108b can be pressed towards each other for releasing the interior plate region 104 from the outer border plate 100.

Although the interconnection elements 108a and 108b are shown as being at the right and left sides of the device 1, they can be arranged at the top and bottom of the device 1 instead. Although the interconnection elements 108a and 108b are preferably arranged at opposite sides of the device 1 so that they can be pressed inwards towards each other, according to an alternative example embodiment, one of them can be arranged at the top or bottom of the device 1 and the other can be arranged at the right or left of the device. Although, preferably two interconnection elements 108a and 108b are provided for easy handling of the interior plate region 104, according to an alternative example embodiment only a single interconnection element is provided.

Figure 3:
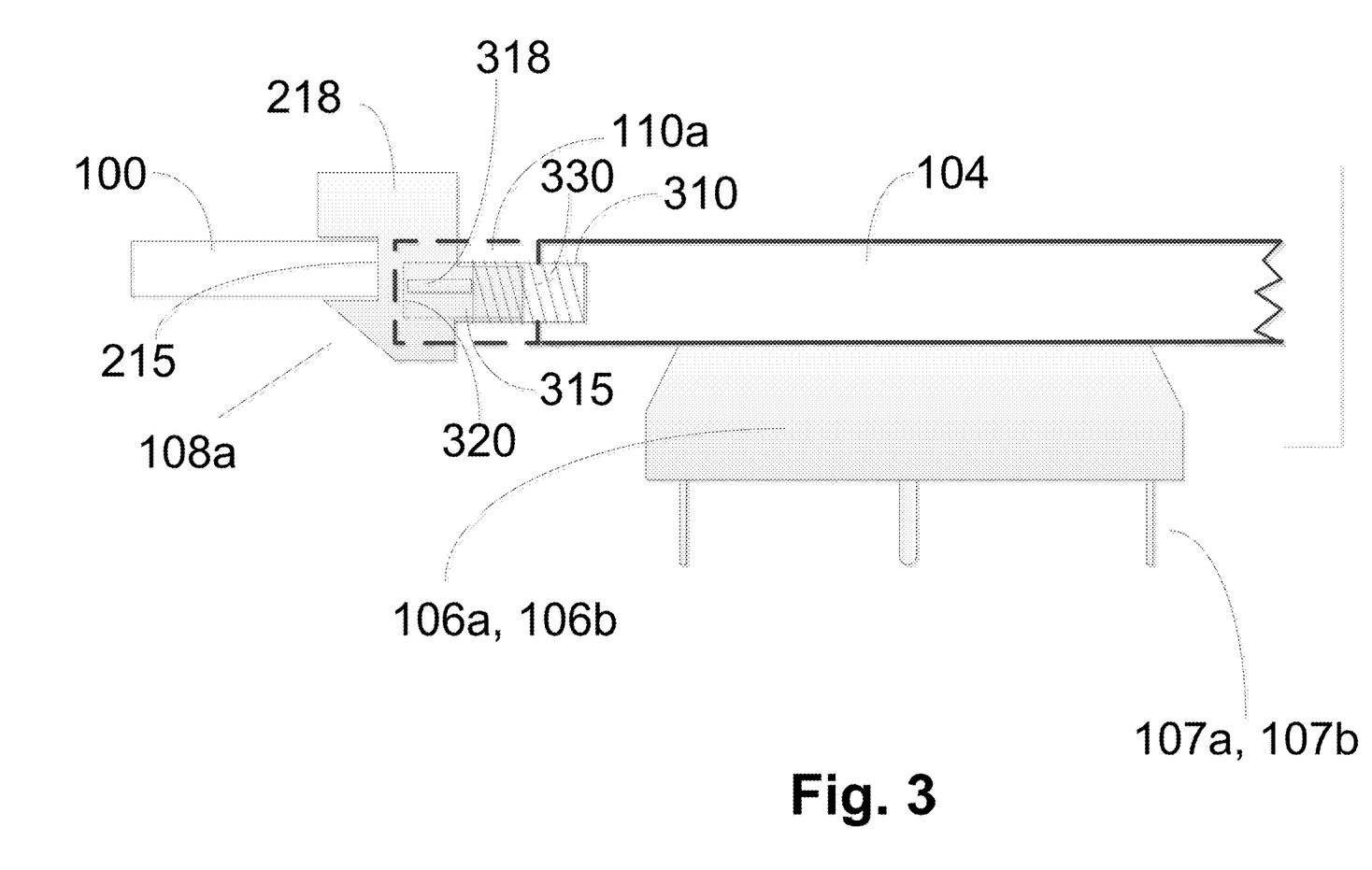
FIG. 3 shows an example of the device 1 at a portion of a cross-section taken along lines B-B' of FIG. 1, according to an alternative example embodiment of the present invention.

FIG. 3 shows an example of the device 1 at a portion of a cross-section taken along lines B-B' of FIG. 1 and the interconnection element 108a, according to an alternative example embodiment of the present invention. According to this example embodiment, the interconnection element 108a includes a cutout 215 for engagement with the outer border plate 100 as described with respect to FIG. 2. It further includes an extension 218 which extends above the cutout 215 as described with respect to FIG. 2, which extension can be pressed upon for sliding the interconnection element 108a in the groove 110a.

Additionally, besides for groove 110a, the interior plate region 104 includes cutouts 310 in the portions of the interior plate region 104 on the two opposite sides of the groove 110a. (In FIG. 3, only the cutout 310 on one of the sides of the groove 110a is shown.) The interconnection element 108a further includes a rear protrusion 315 that extends in a direction extending away from the outer border plate 100 and towards the interior plate region 104. The interconnection element 108a further includes side extensions 318 extending outward in a sideways direction for sliding within the cutouts 310 and which engage an endstop 320 of cutouts 310. A spring 330 extends around the rear protrusion 315 and pushes against the extensions 318 to bias the interconnection element 108a towards the outer border plate 100.

According to example embodiment, as shown in FIG. 3, the bottom of the interconnection element 108a is tapered so that, as the interior plate region 104 is inserted into the outer border plate 100, the tapered surface engages the outer border plate 100, thereby being pushed inward against the force of the spring 330.

Figure 4:
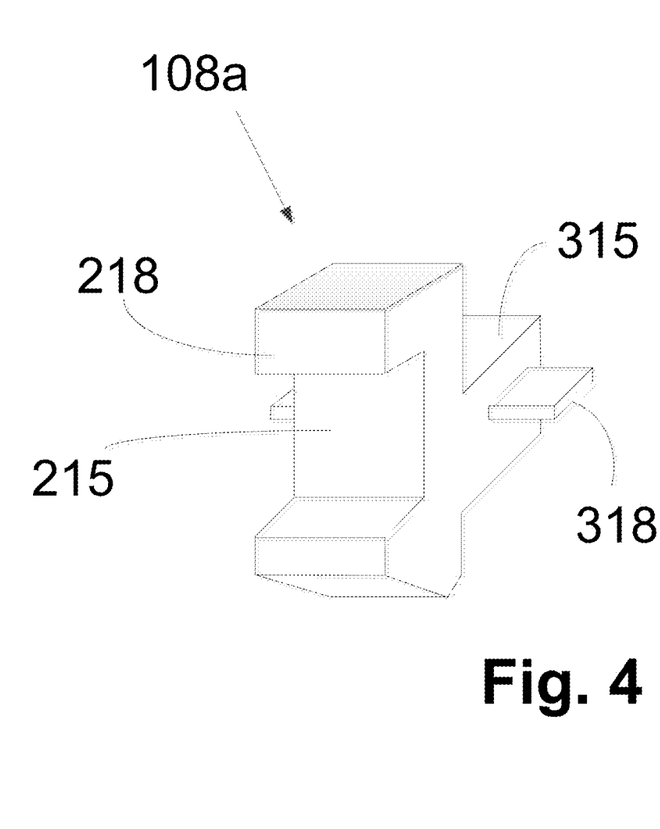
FIG. 4 shows a perspective view of an interconnection element of FIG. 3, according to an example embodiment of the present invention.

FIG. 4 shows a perspective view of the interconnection element 108a of FIG. 3.

In FIG. 1, only the entrances of the sets of female receiving components 106a and 106b. FIG. 3 further shows a body of the female receiving components 106a/106b. FIG. 3 further shows corresponding sets of male components 107a/107b. (Because of the perspective of FIG. 3, only one set is illustrated, the other set being blocked by the first set.) The female receiving components 106a and 106b, and the male components 107a and 107b include conventional extension cord arrangements of socket (106a/106b) and plug (107a/107b) to receive in the socket a plug of an electrical device in the socket, and provide electrical power from an electrical wall outlet to the plugged in electrical device by the plugging in of the plug (107a/107b) of the device 1 into the electrical wall outlet.

Figure 5:
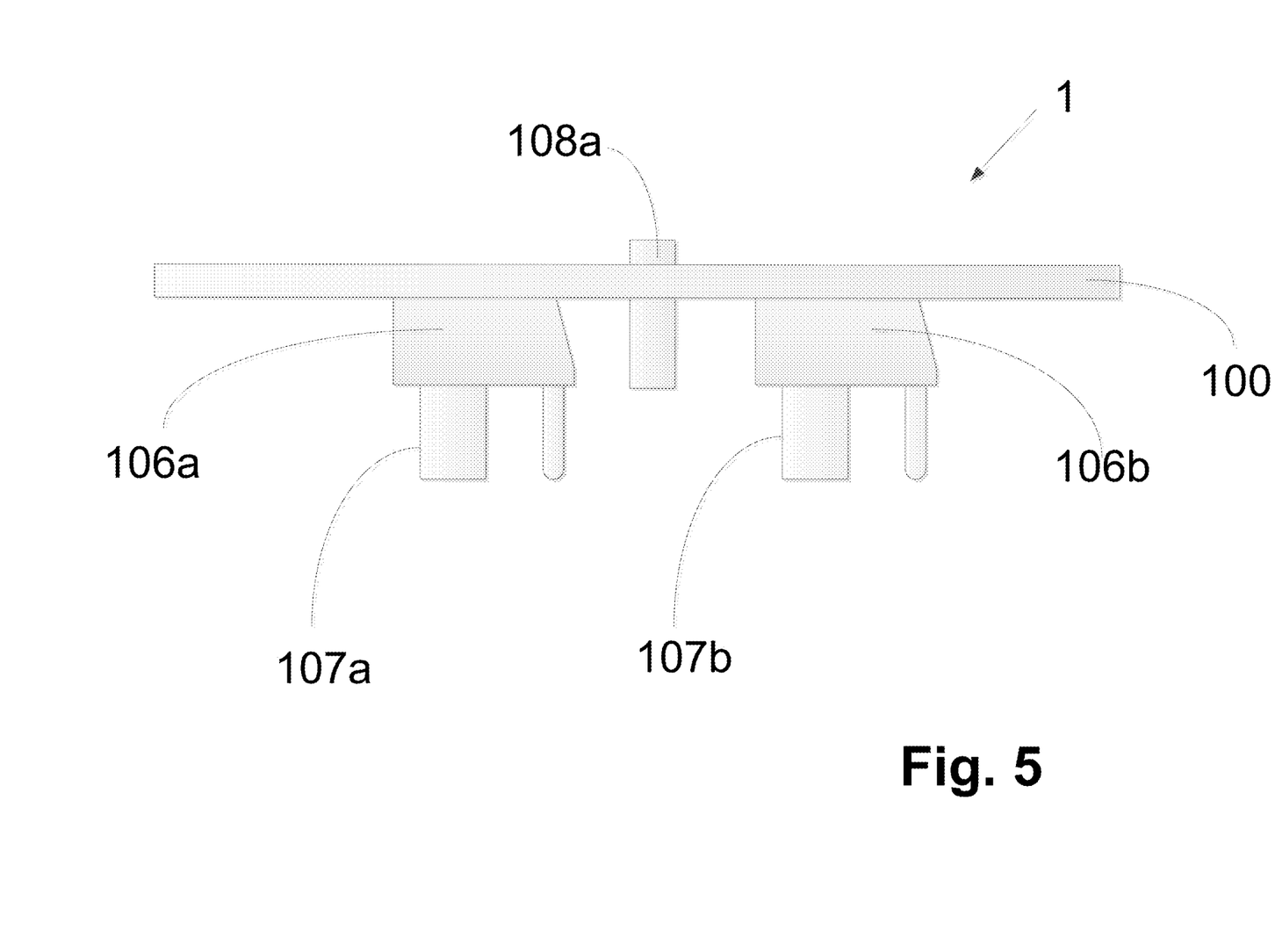
FIG. 5 shows an example of the device at a cross-section taken along lines A-A' of FIG. 1, according to an example embodiment of the present invention.

FIG. 5 shows an example of the device 1 at a cross-section taken along lines A-A' of FIG. 1, according to an example embodiment of the present invention. (The tapering bottom portion of interconnection element 108a is not shown in FIG. 5.)

Figure 6:
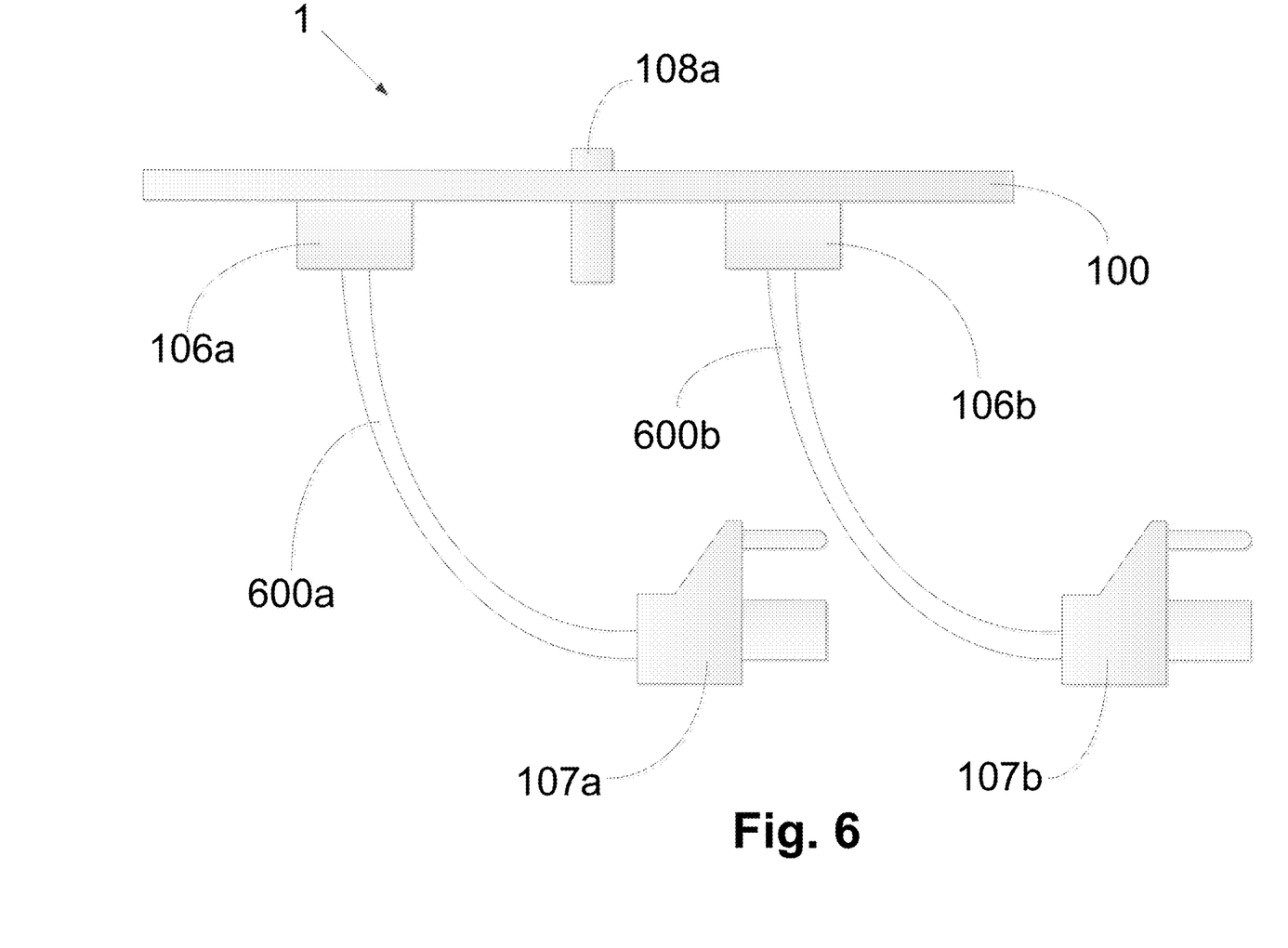
FIG. 6 shows an alternative example of the device at a cross-section taken along lines A-A' of FIG. 1, according to an example embodiment of the present invention.

FIG. 6 shows an alternative example of the device 1 at a cross-section taken along lines A-A' of FIG. 1, according to an example embodiment of the present invention. (The tapering bottom portion of interconnection element 108a is not shown in FIG. 6.) According to this example embodiment, the male components 107a and 107b are connecting to the receiving components 106a and 106b via respective extension wires 600a and 600b, so that male components 107a and 107b can be easily maneuvered due to the flexibility of the wires 600a and 600b. It is noted that the male components 107a and 107b and their respective wires 600a and 600b can be configured according to a low profile connection for better fit between a narrow space between the furniture and the wall outlet. For example, the wire can extend to the male components 107a and 107b in a direction perpendicular to the direction in which the male components 107a and 107b extend.

The female receiving components 106a and 106b are configured for receiving prongs of a plug of an electronic device, which prongs include features like those of the male components 107a and 107b. For example, one would be able to electrically connect two devices 1 to each other by inserting the male components 107a and 107b into the receiving components 106a and 106b of the other device 1.

Figure 7:
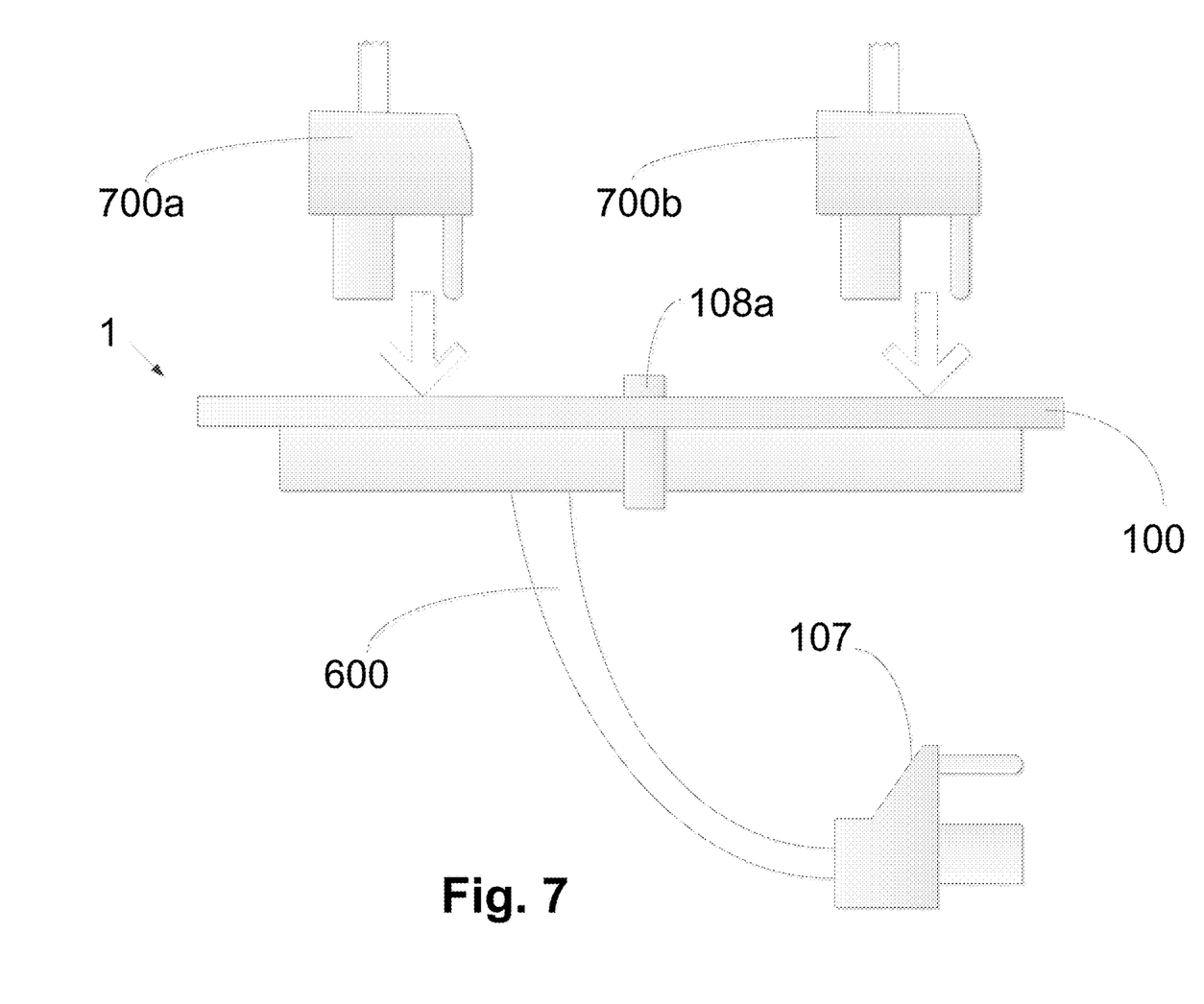
FIG. 7 shows another alternative example of the device at a cross-section taken along lines A-A' of FIG. 1, according to an example embodiment of the present invention.

FIG. 7 shows an alternative example of the device 1 at a cross-section taken along lines A-A' of FIG. 1, according to an example embodiment of the present invention. (The tapering bottom portion of interconnection element 108a is not shown in FIG. 7.) According to this embodiment, the device 1 includes two sets of female receiving components 106a and 106b (not shown) for receiving plugs 700a and 700b of two electronic devices, but includes a single wire 600 leading to a single set of male components 107 for connection to a wall outlet to electrically power both sets of female receiving components 106a and 106b. While this arrangement can be provided for powering both sets of receiving components 106a and 106b using just one socket of an electrical wall outlet, the embodiment described with respect to FIG. 6, showing two sets of male components 107a an 107b provides an advantage with respect to electrical properties.

Figure 8:
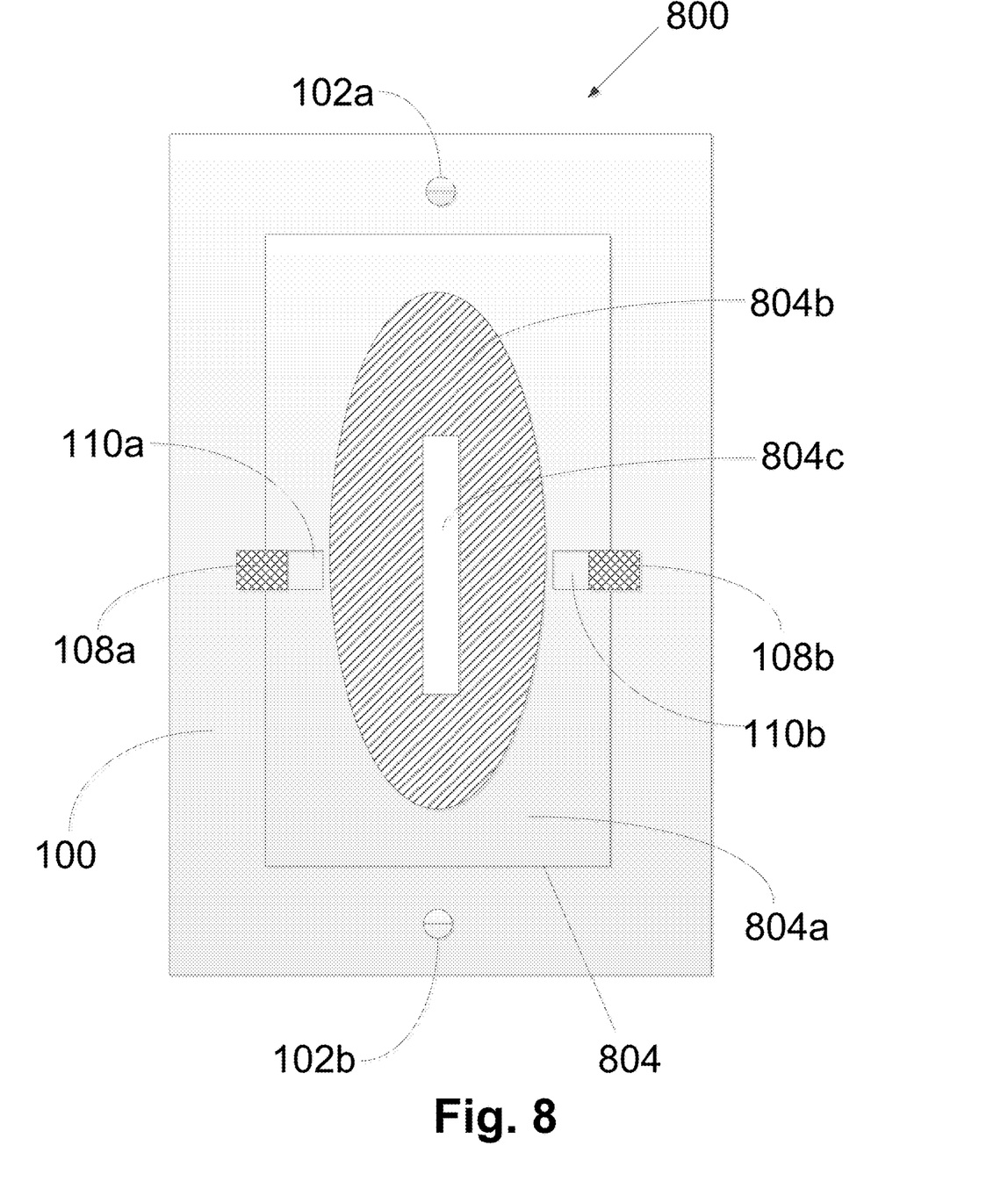
FIG. 8 shows a different example embodiment of a device according to the present invention.

FIG. 8 shows a different example embodiment of the present invention. A device 800 includes some components like those described with respect to FIGS. 1-4. For example, the device 800 includes an outer border plate 100, interconnection components 108a and 108b, and connecting components 102a and 102b. It also includes an interior plate region 804. The interior plate region 804 includes a rigid section 804a, and, interiorly to the rigid section 804a, a flexible section 804b. For example, section 804a can be made of rigid plastic, and section 804b can be made of rubber. Further the section 804b includes therein a slit 804c for receiving therein a head of an extension cord, which extension cord head includes female receiving components like those described above, into which to plug electronic devices. For inserting the head of the extension cord, the flexible material of section 804b is pushed back to essentially form fit to the extension cord head. In this way, the combination of the extension cord head in the device 800 has a similar appearance to an outlet, in that there is an installed plate with female receiving components therein.

Figure 9:
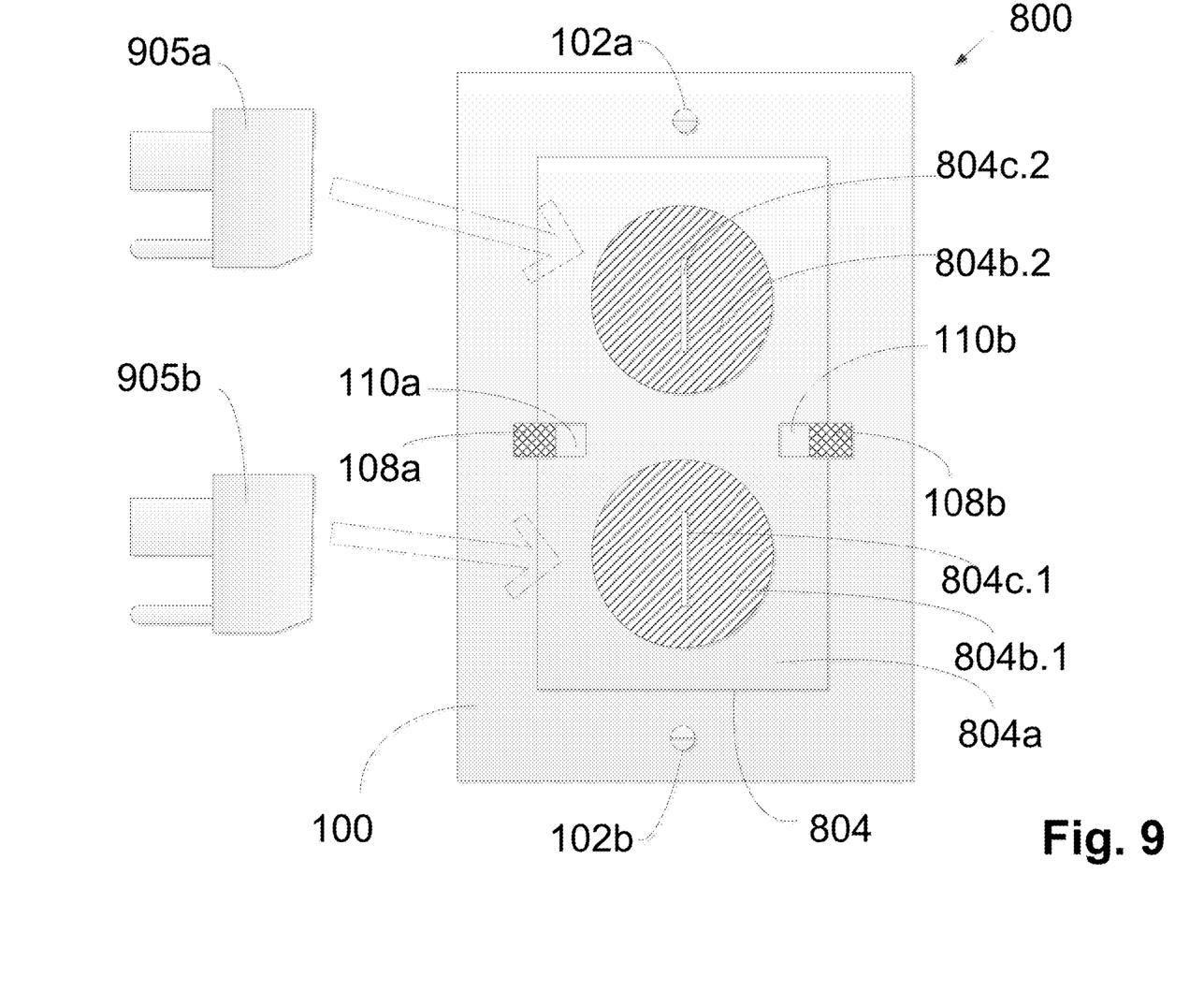
FIG. 9 shows an alternative example embodiment of the device of FIG. 8.

FIG. 9 shows an alternative example embodiment of the device 800 of FIG. 8. The embodiment of FIG. 9 differs from the embodiment shown in FIG. 8 in that the section 804b is split into two smaller sections 804b.1 and 804b.2 with two corresponding slits 804c.1 and 804c.2. These slits 804c.1 and 804c.2 can receive female to male extension heads 905a and 905b.

Although the slits 804c and 804c.1 and 804c.2 are shown in FIGS. 8 and 9 as having a gap between two long edges thereof, in actuality they may be provided such that the two edges touch each other and can be spread apart.

Although the slits 804c.1 and 804c.2 are shown to be provided lengthwise vertically, in alternative example embodiment, they are provided lengthwise horizontally. (Although this can be true for the device 800 of FIG. 8 as well, it is preferably provided lengthwise vertically in device 800 of FIG. 8 so that the slit 804c can be provided with additional length to accommodate a long extension cord bead that includes a plurality of female receiving components.)

Although the slits 804c and 804c.1 and 804c.2 are shown as a single slit, they can instead each be provided as 'x' shaped slits, so that the flexible sections 804b and 804b.1 and 804b.2 each include four triangular sections that can each be pushed apart from each other when the extension heads are inserted.

Figure 10:
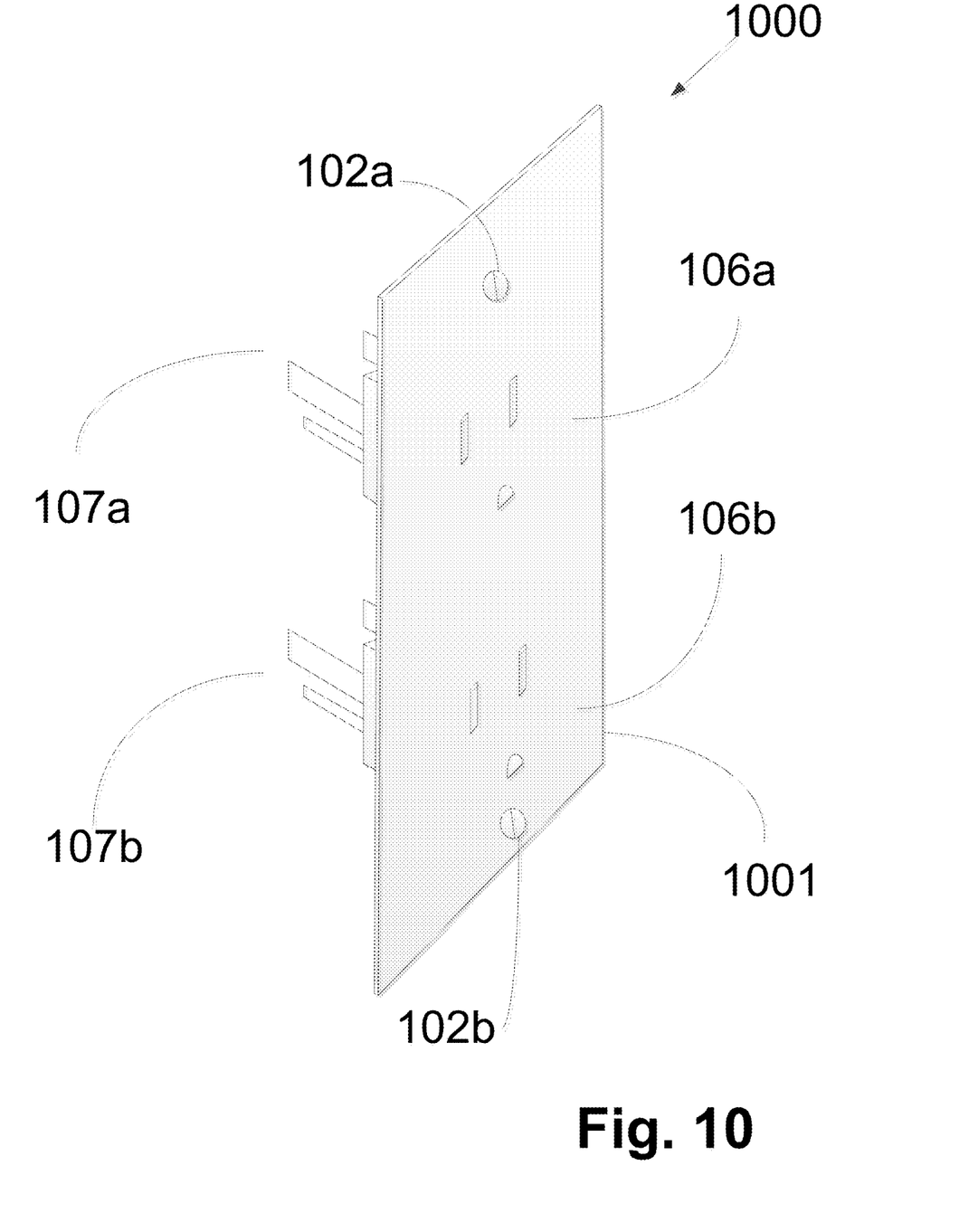
FIG. 10 shows an alternative example embodiment of the present invention, with a single faceplate surface.

FIG. 10 shows an alternative example embodiment of the present invention, similar to the device of FIG. 1, but with a single faceplate surface that is attachable to furniture and includes in an interior region receiving components for receiving the prongs of electronic devices. FIG. 10 shows a device 1000 that includes a plate 1001. The plate includes connecting components 102a and 102b like those described above. It further includes holes on a front side, which are the entrances of the receiving components 106a and 106b. It further includes on the reverse side the male components 107a and 107b. The receiving components 106a and 106 extend rearward, beyond a back surface of an outer region of the plate 1001 so that the plate 1001 can be connected to furniture, with the receiving components 106a and 106b and the male components 107a and 107b extending through a hole in the furniture.

Similarly, according to an example embodiment of the present invention, the devices 800 shown in alternative versions in FIGS. 8 and 9 are provided, in yet another alternative, with a single integrated plate as described with respect to device 1 with respect to FIG. 10. However, the two-plate construction of FIGS. 8 and 9 provide an advantage in that should the extension cord head or female-to-male extension heads inserted into the slits 804c or 804c.1 and 804c.2 are mistakenly pushed out, in back of furniture in which the device 800 is installed, they can be easily retrieved, by removal of the interior plate region 804.

The above description is intended to be illustrative, and not restrictive. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. An outlet extension device, comprising:
    a faceplate that includes a thick inner center region and a thin peripheral region, wherein:
        the peripheral region surrounds the inner center region and extends from an outer edge of the faceplate inwards to the inner center region;
        a front face of the peripheral region and a front face of the inner center region are substantially flush;
        a rear face of the peripheral region and the front face of the peripheral region are substantially parallel to each other;
        the inner center region includes receptacles;
        at a rear of the faceplate, the inner center region, including the receptacles, extends rearward beyond a rear face of the peripheral region;
        the inner center region includes prongs that are rearward of the receptacles;
        the inner cent region includes electrical delivery circuitry;
        the receptacles are configured for receiving therein prongs of a plug that are (a) dimensioned like the prongs of the inner center region, by insertion of the prongs of the plug into the receptacles via openings in the front face of the inner center region, and (b) insertable, for electrically powering an electrical device, into an outlet into which the prongs of the inner center region are also insertable for supplying electrical power from the outlet to the electrical device via the electrical delivery circuitry of the inner center region;
        (a) at least two through-holes extend through the peripheral region and/or (b) the outlet extension device further comprises an adhesive material on the rear face of the peripheral region by which the faceplate can be adhered to a wall of a component through a hole in which wall the inner center region is extendable when the peripheral region is adhered to the wall; and
        the prongs of the inner center region are rearward of a rear face of the inner center region and longitudinally extend from the rear face of the inner center region rigidly in a fixed direction relative to the rear face, the rear face of the inner center region being a rear exterior face of the faceplate.

2. The device of claim 1, wherein the at least two through-holes extend through the peripheral region.

3. An outlet extension device comprising:
    a faceplate that includes a thick inner center region and a thin peripheral region, wherein:
        the peripheral region surrounds the inner center region and extends from an outer edge of the faceplate inwards to the inner center region;
        a front face of the peripheral region and a front face of the inner center region are substantially flush;
        a rear face of the peripheral region and the front face of the peripheral region are substantially parallel to each other;
        the inner center region includes receptacles;
        at a rear of the faceplate, the inner center region, including the receptacles, extends rearward beyond a rear face of the peripheral region;
        the inner center region includes prongs that are rearward of the receptacles;
        the inner center region includes electrical delivery circuitry;
        the receptacles are configured for receiving therein prongs of a plug that are (a) dimensioned like the prongs of the inner center region, by insertion of the prongs of the plug into the receptacles via openings in the front face of the inner center region, and (b) insertable, for electrically powering an electrical device, into an outlet into which the prongs of the inner center region are also insertable for supplying electrical power from the outlet to the electrical device via the electrical delivery circuitry of the inner center region;
        (a) at least two through-holes extend through the peripheral region and/or (b) the outlet extension device further comprises an adhesive material on the rear face of the peripheral region by which the faceplate can be adhered to a wall of a component through a hole in which wall the inner center region is extendable when the peripheral region is adhered to the wall; and
        the prongs of the inner center region are attached to a flexible wire that extends between a rear face of the inner center region and the prongs of the inner center region.

4. The device of claim 2, further comprising screws or nails extending through the through-holes of the peripheral region.

5. The device of claim 1, wherein the fixed direction is substantially perpendicular to the rear face of the inner center region.

6. An outlet extension device comprising:
    a faceplate that includes a thick inner center region and a thin peripheral region, wherein:
        the peripheral region surrounds the inner center region and extends from an outer edge of the faceplate inwards to the inner center region;
        a front face of the peripheral region and a front face of the inner center region are substantially flush;
        a rear face of the peripheral region and the front face of the peripheral region are substantially parallel to each other;
        the inner center region includes receptacles;
        at a rear of the faceplate, the inner center region, including the receptacles, extends rearward beyond a rear face of the peripheral region;

the inner center region includes prongs that are rearward of the receptacles;

the inner center region includes electrical delivery circuitry;

the receptacles are configured for receiving therein prongs of a plug that are (a) dimensioned like the prongs of the inner center region, by insertion of the prongs of the plug into the receptacles via openings in the front face of the inner center region, and (b) insertable, for electrically powering an electrical device, into an outlet into which the prongs of the inner center region are also insertable for supplying electrical power from the outlet to the electrical device via the electrical delivery circuitry of the inner center region;

(a) at least two through-holes extend through the peripheral region and/or (b) the outlet extension device further comprises an adhesive material on the rear face of the peripheral region by which the faceplate can be adhered to a wall of a component through a hole in which wall the inner center region is extendable when the peripheral region is adhered to the wall; and the prongs are arranged at a first end of a wire, and a second end of the wire is attached to a surface of the inner center region so that a direction of a longitudinal extension of the prongs relative to the rear face of the inner center region is not fixed.

7. The device of claim 6, wherein the surface to which the second end of the wire is attached is a rear face of the inner center region.

8. The device of claim 1, wherein a number of the prongs of the inner center region is less than a number of the receptacles of the inner center region.

9. The device of claim 1, wherein the inner center region and the peripheral region are releasably connected to each other.

10. The device of claim 9, wherein the inner center region includes, at an outer edge thereof, clips that are biased outward for connecting the inner center region to the peripheral region, the clips being inwardly pressable for releasing the inner center region from the peripheral region.

11. The device of claim 10, wherein the clips are latchable onto corresponding sections of the peripheral region, and a number of the corresponding sections of the peripheral region is equal to a number of the clips that are included, the clips not being latchable onto any other section of the peripheral region.

12. The device of claim 10, wherein the peripheral region includes a number of cutouts for receiving each of the clips, the number of cutouts being equal to a number of the clips that are included.

13. The device of claim 1, wherein the outlet extension device comprises the adhesive material on the rear face of the peripheral region by which the faceplate can be adhered to the wall of the component through the hole in which wall the inner center region is extendable when the peripheral region is adhered to the wall.

14. The device of claim 1, wherein the receptacles are configured for tight receipt of the prongs of the plug that are dimensioned like the prongs of the inner center region.

15. The device of claim 3, wherein the inner center region and the peripheral region are releasably connected to each other, and the inner center region includes, at an outer edge thereof, clips that are biased outward for connecting the inner center region to the peripheral region, the clips being inwardly pressable for releasing the inner center region from the peripheral region.

16. The device of claim 15, wherein the clips are latchable onto corresponding sections of the peripheral region, and a number of the corresponding sections of the peripheral region is equal to a number of the clips that are included, the clips not being latchable onto any other section of the peripheral region.

17. The device of claim 15, wherein the peripheral region includes a number of cutouts for receiving each of the clips, the number of cutouts being equal to a number of the clips that are included.

18. The device of claim 6, wherein the inner enter region and the peripheral region are releasably connected to each other, and the inner center region includes, at an outer edge thereof, clips that are biased outward for connecting the inner center region to the peripheral region, the clips being inwardly pressable for releasing the inner center region from the peripheral region.

19. The device of claim 18, wherein the clips are latchable onto corresponding sections of the peripheral region, and a number of the corresponding sections of the peripheral region is equal to a number of the clips that are included, the clips not being latchable onto any other section of the peripheral region.

20. The device of claim 18, wherein the peripheral region includes a number of cutouts for receiving each of the clips, the number of cutouts being equal to a number of the clips that are included.

* * * * *